United States Patent
Varghese et al.

(10) Patent No.: US 12,508,075 B2
(45) Date of Patent: Dec. 30, 2025

(54) LIGHT BASED SKIN TREATMENT DEVICE

(71) Applicant: KONINKLIJKE PHILIPS N.V., Eindhoven (NL)

(72) Inventors: Babu Varghese, Eindhoven (NL); Rieko Verhagen, Vught (NL)

(73) Assignee: Koninklijke Philips N.V., Eindhoven (NL)

( * ) Notice: Subject to any disclaimer, the term of this patent is extended or adjusted under 35 U.S.C. 154(b) by 1011 days.

(21) Appl. No.: 16/962,521

(22) PCT Filed: Jan. 9, 2019

(86) PCT No.: PCT/EP2019/050458
§ 371 (c)(1),
(2) Date: Jul. 16, 2020

(87) PCT Pub. No.: WO2019/145148
PCT Pub. Date: Aug. 1, 2019

(65) Prior Publication Data
US 2020/0345418 A1    Nov. 5, 2020

(30) Foreign Application Priority Data
Jan. 24, 2018   (EP) .................... 18153266

(51) Int. Cl.
*A61B 18/20*   (2006.01)
*A61B 18/00*   (2006.01)

(52) U.S. Cl.
CPC .... *A61B 18/203* (2013.01); *A61B 2018/0047* (2013.01); *A61B 2018/00476* (2013.01); *A61B 2018/20553* (2017.05)

(58) Field of Classification Search
CPC ........ A61B 18/203; A61B 2018/20553; A61B 2018/0047; A61B 2018/00476; A61B 2018/00452
See application file for complete search history.

(56) References Cited

U.S. PATENT DOCUMENTS 4,729,372 A * 3/1988 L'Esperance, Jr. .......... A61F 9/00804 606/5
2005/0215987 A1 * 9/2005 Slatkine ............ A61B 18/203 606/9

(Continued)

FOREIGN PATENT DOCUMENTS

KR    101816492 B1 *  1/2018 .............. A61N 5/06
WO    2005011510 A1    2/2005

(Continued)

OTHER PUBLICATIONS

Yin et al, Propagation characteristics of annular laser beams passing through the reflection Bragg grating with deformation, Optics & Laser Technology, vol. 43, Issue 4, 2011, pp. 787-794, ISSN 0030-3992 (Year: 2011).*

(Continued)

*Primary Examiner* — Nathan J Jenness

(57) ABSTRACT

A light-based skin treatment device is for treating skin by laser induced optical breakdown of hair or skin tissue. A focusing system has an exit focusing lens for focusing the incident light beam into a focal spot in the hair or skin tissue. This lens has a central aperture. This serves to reduce back-reflectance from the lens surface, which can cause damage to the focusing system.

20 Claims, 2 Drawing Sheets

(56) References Cited

U.S. PATENT DOCUMENTS

| | | | |
|---|---|---|---|
| 2008/0132886 A1 | 6/2008 | Cohen et al. | |
| 2012/0226268 A1* | 9/2012 | Liu | A61N 5/0613 |
| | | | 606/9 |
| 2015/0301428 A1 | 10/2015 | Arnold et al. | |
| 2016/0157935 A1* | 6/2016 | Jurna | A61B 18/203 |
| | | | 606/9 |
| 2016/0256707 A1* | 9/2016 | Poran | A61B 18/203 |
| 2016/0271419 A1 | 9/2016 | Varghese | |
| 2017/0038284 A1* | 2/2017 | Nemati | A61B 18/203 |
| 2020/0345018 A1 | 11/2020 | Ebert | |

FOREIGN PATENT DOCUMENTS

| | | | | |
|---|---|---|---|---|
| WO | 2008001284 A2 | 1/2008 | | |
| WO | WO-2011121536 A1 * | 10/2011 | | G02B 26/0816 |
| WO | 2013128380 A1 | 9/2013 | | |
| WO | WO-2014020512 A1 * | 2/2014 | | B23K 26/38 |
| WO | WO-2014045216 A1 * | 3/2014 | | A61B 18/203 |
| WO | WO-2014145717 A2 * | 9/2014 | | A61B 18/22 |
| WO | WO-2015071099 A1 * | 5/2015 | | A61B 18/042 |
| WO | 20150110273 A1 | 7/2015 | | |

OTHER PUBLICATIONS

International Search Report from PCT/EP2019/050458 mailed Feb. 4, 2019.

L Habbema, R Verhagen, R Van Hal, Y Liu, B Varghese, "Minimally invasive non-thermal laser technology using laser-induced optical breakdown for skin rejuvenation," Journal of Biophotonics 5 (2), 194-199 (2012).

L Habbema, R Verhagen, R Van Hal, Y Liu, B Varghese, Efficacy of minimally invasive nonthermal laser-induced optical breakdown technology for skin rejuvenation, Lasers in medical science 28 (3), 935-940 (2013).

C. J. R. Sheppard, "Use of lenses with annular aperture in scanning optical microscopy," Optik, vol. 48, No. 3, pp. 329-334, 1977.

S. W. Hell, P. E. Hanninen, A. Kuusisto, M. Schrader, and E. Soini, "Annular aperture two-photon excitation microscopy," Optics Communications, vol. 117, No. 1-2, pp. 20-24, 1995.

* cited by examiner

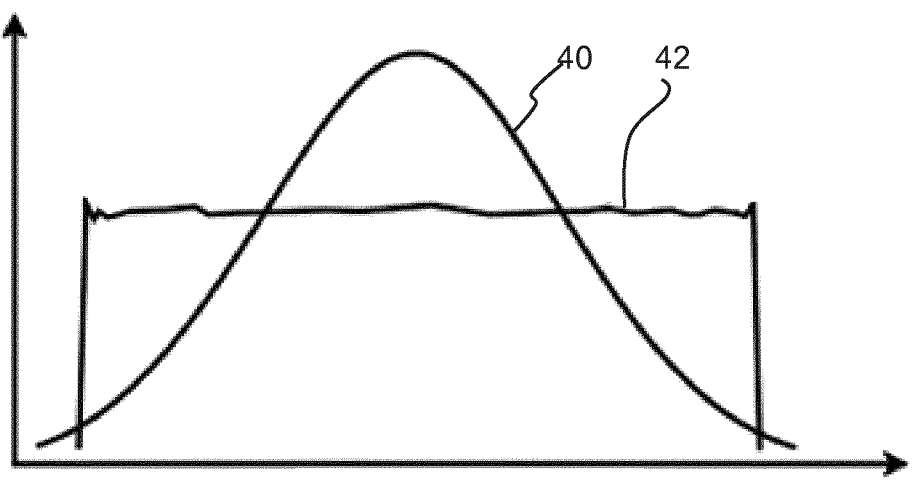
FIG. 3
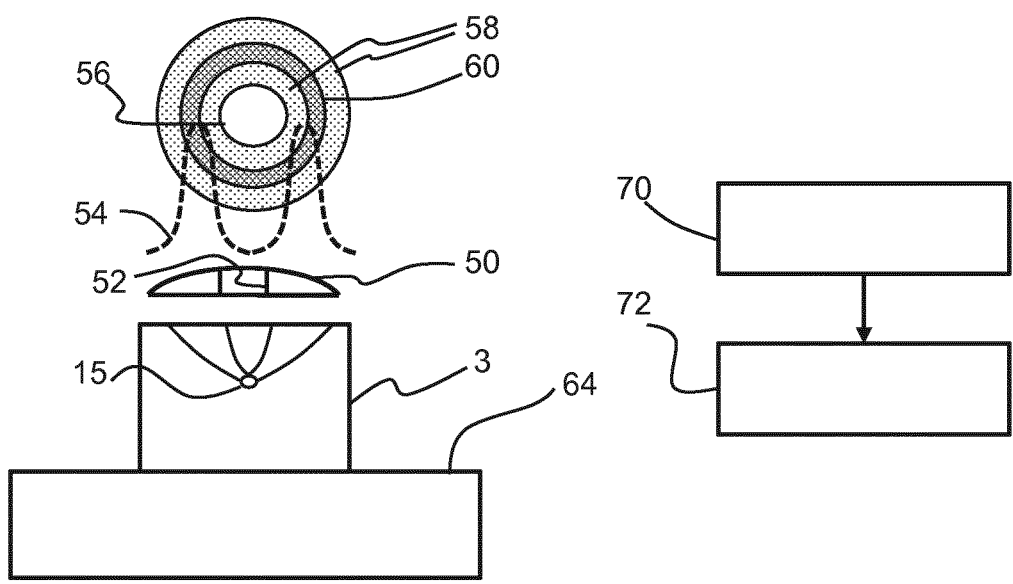
FIG. 4
FIG. 5

LIGHT BASED SKIN TREATMENT DEVICE

CROSS REFERENCE TO RELATED APPLICATIONS

This application is a U.S. national phase application of International Application No. PCT/EP2019/050458 filed on Jan. 9, 2019, which claims the benefit of EP Application Ser. No. 18/153,266.4 filed on Jan. 24, 2018 and are incorporated herein by reference.

FIELD OF THE INVENTION

This invention relates to a light-based skin treatment device. The device comprises a light source, an optical system and a transparent exit window. The light source serves to provide an incident light beam for treating a skin by laser induced optical breakdown (LIOB) of hair or skin tissue. The transparent exit window allows the incident light beam to exit the device. The optical system is provided for focusing the incident light beam into a focal spot in the hair or skin tissue outside the skin treatment device.

BACKGROUND OF THE INVENTION

Such light-based skin treatment devices are, e.g., used for wrinkle treatment and for hair cutting. In light-based wrinkle treatment, the device creates a focal spot in a dermis layer of the skin to be treated. The power and pulse duration of the laser and the dimension of the focal spot are selected such that a laser induced optical breakdown (LIOB) phenomenon affects the skin in order to stimulate re-growth of skin tissue and, therewith, to reduce wrinkles. In light-based hair cutting, the incident light beam is focused inside the hair and the LIOB phenomenon causes the hair to be cut through.

For example, the international patent application published as WO 2005/011510 describes a device for shortening hairs comprising a laser source for generating a laser beam during a predetermined pulse time, an optical system for focusing the laser beam into a focal spot and a laser beam manipulator for positioning the focal spot in a target position. A dimension of the focal spot and a power of the generated laser beam are such that in the focal spot the laser beam has a power density which is above a characteristic threshold value for hair tissue above which, for the predetermine pulse time, a laser induced optical breakdown (LIOB) phenomenon occurs in the hair tissue. WO 2008/001284 discloses further details, and for example discusses the laser beam requirements and required focusing system characteristics, such as the numerical aperture of the exit lens.

In general, laser induced optical breakdown (LIOB) occurs in media, which are transparent or semi-transparent for the wavelength of the laser beam, when the power density (W/cm$^2$) of the laser beam in the focal spot exceeds a threshold value which is characteristic for the particular medium. Below the threshold value, the particular medium has relatively low linear absorption properties for the particular wavelength of the laser beam. Above the threshold value, the medium has strongly non-linear absorption properties for the particular wavelength of the laser beam, which are the result of ionization of the medium and the formation of plasma. This LIOB phenomenon results in a number of mechanical effects, such as cavitation and the generation of shock waves, which damage the medium in positions surrounding the position of the LIOB phenomenon.

LIOB utilizes high intensity sub-nanosecond or (so called picosecond) laser pulses to generate a high flux of photons necessary for the multiphoton absorption in the skin. The nonlinear LIOB process occurs only in the focal volume when extremely high photon flux surpassing the intensity threshold required for optical breakdown is generated in the focus by high numerical aperture (NA) focusing.

LIOB based skin treatment devices use a class 4 laser, which is potentially dangerous for the user. It is therefore important to include safety means to assure the safety of the user and the expensive device.

Traditionally, LIOB utilizes fundamental Gaussian TEM$_{00}$ modes, in which the transverse profile of the optical intensity of the beam is described with a Gaussian function. For Gaussian beams, the peak intensity, namely the intensity on the beam axis, is two times the power divided by the effective mode area (Effective mode area=$\pi w^2$, where w is the mode radius). When TEM$_{00}$ Gaussian beams are used for creating LIOB, the exit focusing lens is often damaged due to back-reflectance from the skin, in particular at the center of the beam corresponding to the peak intensity.

The damaged lens can lead to poor treatment efficacy and non-desirable side effects for the user. In particular, a damaged exit window has a detrimental effect on the ability of the device to provide a sufficiently tight focus at the desired position, which may reduce the efficacy of the treatment process and/or may increase the occurrence of adverse side effects, such as skin irritation. If superficial lesions are created above the dermis, petechiae (micro-bleeding) will occur due to the micro-rupturing of capillaries, resulting in reduced efficacy, increased side effects and social down time.

Even though many active safety systems have been reported in the past, they are sensitive to failure, and they can be rather complex and therefore expensive.

An alternative option is to use Gaussian to Top-Hat converters to convert single mode Gaussian laser beam profiles to flat top laser beam profiles.

There remains a need for a more simple, passive, robust system to further increase the safety of the device and user compared to Gaussian and Top-hat intensity profiles.

SUMMARY OF THE INVENTION

The invention is defined by the claims.

Examples in accordance with a first aspect of the invention provide a light-based skin treatment device comprising:
  a laser light source for providing a pulsed incident light beam for treating skin by laser induced optical breakdown of hair or skin tissue; and
  a focusing system for focusing the incident light beam into a focal spot in the hair or skin tissue,
  wherein the focusing system comprises an exit focusing lens having a central evacuated or air-filled aperture.

The aperture in the exit lens creates an annular shaped focused beam. The peak irradiance of the laser light at the skin surface is lowered by distributing the laser energy in a ring instead of a Gaussian beam profile. This lowers the intensity at any given point of the skin while retaining the photon flux in the focal volume as would be achieved using a Gaussian intensity profile. This reduces the back-reflected light due to the peak intensity at the center of the beam. This prevents contact window or exit lens damage and potential skin damage, thereby improving the safety and efficacy of the LIOB-based skin treatment.

For the same photon fluencies in the focal region, the annular illumination generates reduced levels of light back-reflected from the skin along the on-axis of the beam where the laser power is minimum, compared to a Gaussian illumination where the on-axis of the beam has a maximum intensity.

The laser light source preferably comprises a 1064 nm laser. This provides low absorption and scattering inside the skin and thus provides a large penetration depth.

The laser light source is for example adapted to deliver pulses of energy 1 to 10 mJ, and with a pulse duration of 100 fs to 10 ns, for example 100 ps to 10 ns. This provides energy levels suitable for LIOB.

The exit focusing lens preferably has a high numerical aperture to provide effective tight focusing to a desired point for safe operation of the system.

The aperture for example has a diameter of less than 1 mm, for example less than 0.5 mm.

The aperture for example has an area of less than 5% of the area of the exit focusing lens, or less than 5% of the effective aperture of the exit focusing lens.

The device may comprise a beam shaping arrangement for generating an annular pulsed incident light beam.

The beam shaping arrangement may comprise:
a spatial light modulator; or
a phase mask; or
a blanking mask; or
a holographic plate; or
a grating.

These are various options for creating a desired annular beam.

The invention also provides a light-based skin treatment method comprising:
providing a pulsed incident light beam for treating skin by laser induced optical breakdown of hair or skin tissue;
focusing the incident light beam into a focal spot in the hair or skin tissue by focusing using an exit focusing lens having a central aperture with a diameter less than 1 mm.

The pulsed incident light may be 1064 nm laser light, with pulses of energy 1 to 10 mJ and duration of 100 fs to 10 ns, for example 100 ps to 10 ns.

The method may comprise generating an annular pulsed incident light beam.

These methods are non-therapeutic methods, in particular cosmetic methods, for skin rejuvenation or hair removal.

BRIEF DESCRIPTION OF THE DRAWINGS

Examples of the invention will now be described in detail with reference to the accompanying drawings, in which:

FIG. 3 shows one possible way to implement beam shaping to reduce damage from back-reflections;

FIG. 4 shows a known focusing lens in accordance with the invention in more detail; and FIG. 5 shows a laser treatment method.

DETAILED DESCRIPTION OF THE EMBODIMENTS

Figure 1:
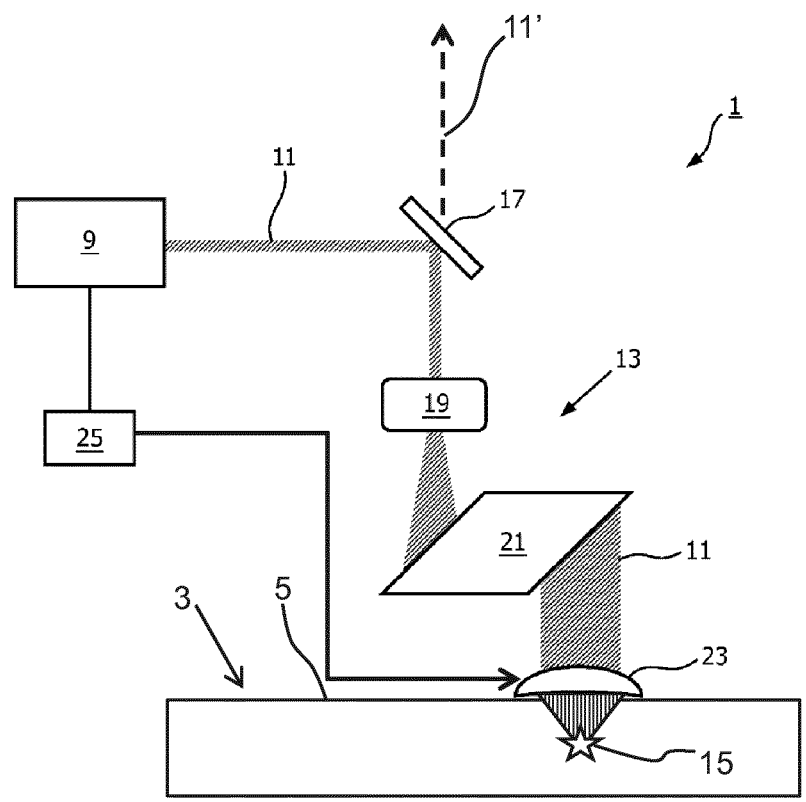
FIG. 1 schematically shows a known LIOB skin treatment device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a light-based skin treatment device for treating skin by laser induced optical breakdown of hair or skin tissue. A focusing system has an exit focusing lens for focusing the incident light beam into a focal spot in the hair or skin tissue. This lens has a central aperture. This serves to reduce back-reflectance from the lens surface, which can cause damage to the focusing system.

Before describing the invention in detail, an outline will be given of one example of the type of device to which the invention relates.

FIG. 1 shows a system 1 for treatment of a skin 3 having a surface 5.

The system 1 comprises a light source 9 for generating a laser beam 11 during at least a predetermined pulse time, and it comprises an optical system 13 for focusing the laser beam 11 into a focal spot 15 and for positioning the focal spot 15 in a target position within the skin 3, which is at least partly transparent to the light from the light source 9.

The example of the optical system 13 schematically indicated in FIG. 1 comprises a beam deflection and dichroic beam splitting system 17, an aberration correcting system 19, a beam scanning system 21 and a focusing system 23, which systems may comprise one or more mirrors, prisms, beam splitters, polarizers, optical fibers, lenses, apertures, shutters, etc. For example, the scanning system comprises scanning prisms.

The focusing system has focusing depth selection, beam shaping and focusing and a contact/output window. There is a contour following suspension to maintain contact of the contact/output window.

At least part of the optical system 13 and/or the beam path of the laser beam 11 may be enclosed, e.g. for eye-safety, e.g. comprising opaque tubes and/or one or more optical fibers.

The light source 9 is configured to emit a predetermined number of laser pulses at a predetermined wavelength and with a predetermined pulse duration and repetition rate. The system 1 is configurable such that the target position of the focal spot 15 is beneath the surface of the skin. The dimension of the focal spot 15 and the power of the generated laser beam are such that, in the focal spot 15, the laser beam 11 has a power density, which is above the characteristic threshold value for the skin tissue, above which, for the predetermined pulse time, a laser-induced optical breakdown event occurs.

There may be an articulating arm between the laser source 9 and the beam deflection and dichroic beam splitting system 17. The beam deflection system 17 and subsequent components form part of a hand piece. Because of alignment errors in the mirrors of the articulating arm, the beam may be expanded before entering the articulating arm and then compressed afterwards before beam steering and aberration correction.

The skin 3 comprises multiple layers with different optical properties. The epidermis is composed of the outermost layers and forms a waterproof protective barrier. The outermost layer of the epidermis is the stratum corneum which, due to its microscopic fluctuations in roughness, impedes the coupling of light between the device 1 and the skin 3. For this reason, a coupling fluid is preferably provided between the focusing system and the skin, with a refractive index which aims to match that of the skin and/or an exit lens of the focusing system.

Underneath the epidermis, the dermis is situated. The dermis comprises the collagen fibers at which the skin treatment is aimed.

In one example use of the system, the purpose of the skin treatment is to create the focus 15 of the pulsed laser beam 11 in the collagen of the dermis in order to create microscopic lesions which result in new collagen formation.

The light source 9 is controllable with an optional controller 25, which may provide a user interface. Also, one or more parts of the optical system 13 may be controllable with an optional controller (not shown), which may be integrated with a light source controller 25 to control one or more properties of the target position and/or the focal spot.

Laser beam focusing parameters may be determined by appropriate settings of a beam shaping and/or focusing system, e.g. by adjustment of the numerical aperture of the focusing system. The optical system has a numerical aperture of at least 0.2, preferably at least 0.4, more preferably at least 0.6. Such values for the numerical aperture relate to safety for the overlying skin layers, in particular the epidermis.

A suitable light source comprises a Q-switched Nd:YAG laser emitting laser pulses at a wavelength of about 1064 nm with a pulse duration of about 100 ps to 10 ns. In this range, the plasma generated by the LIOB is very local, i.e. has a small spatial extension, which minimizes the risk of unintended damage to surrounding tissues. Furthermore, the peak power required to obtain LIOB is substantially independent of the pulse time in this range. However, other pulse times, e.g. in the range of about 100 fs to 100 ps, may also be used.

The pulse energy may be 1 to 10 mJ.

The exit lens 50 is a high NA focusing lens.

1064 nm is preferably used for treatment because of the relatively low absorption and scattering inside the skin and thereby providing large penetration depth. Other lasers, e.g. a Nd:Cr:Yag 3-level laser and/or diode lasers may be used as well. Another example is Er:YAG lasers with emission at 1645 nm.

The beam deflection and dichroic beam splitting system 17 comprises a dichroic beam splitter which reflects the laser light but passes visible wavelength light. Thus, received visible wavelength light from the skin 3 is captured by the optical system and is provided as a feedback signal 11' which can be used for controlling the system either manually or automatically.

The focusing depth provided by the focusing system 23 is preferably adjustable.

Figure 2:
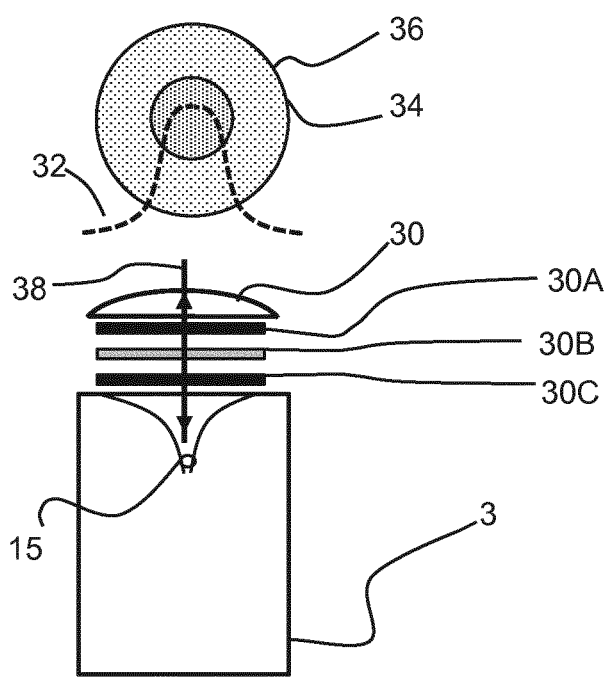
FIG. 2 shows a known focusing lens in more detail.

FIG. 2 shows focusing system with a conventional exit focusing lens 30 which provides focused laser pulses into the skin 3, thereby creating LIOB at the focus 15. The intensity profile is shown as plot 32, with a high intensity central portion 34 and a lower intensity annular band 36.

The first directly back-reflected light will be from the exit surface of the focusing lens 30 and if there are multiple layers 30A, 30B, 30C before the skin, as shown in FIG. 2, then each layer will contribute to the back-reflected light. The incident and direct reflected rays are shown by the arrows 38. The rays bent by the lens focusing function do not contribute to the direct back-reflected light.

The layers 30A, 30B, 30C for example are provided to improve the optical coupling to the skin, and may comprise a gel comprising a mixture of polar and apolar substances, a transparent foil and an oil. The use of such additional layers is for example explained in more detail in WO 2013/128380.

As mentioned above, Gaussian to Top-Hat converters may be used, as shown in FIG. 3, to convert a single mode Gaussian laser beam profile 40 to a flat top laser beam profile 42.

FIG. 4 shows the approach of the invention in which the exit focus lens 50 is modified to include a central aperture 52. For simplicity, no additional coupling layers are shown in FIG. 4 although they may of course be present.

Typically there will be underfilling beneath the full aperture of the lens 50 with an immersion fluid. This means the effective aperture of the lens will be less than the maximum real lens aperture.

The central aperture for example has an area which is only few percent of the area based on the effective aperture (diameter) of the lens. Typically this area will be below 5% such as in the range 0.25% to 5%. For example, for a real lens aperture of 4 mm, the effective aperture may be 3.6 mm (hence area 10.2 $mm^2$), and the diameter of the central hole is for example in the range 0.2-0.4 mm (hence area 0.03 $mm^2$ to 0.50 $mm^2$).

The aperture is intended to prevent lens damage resulting from the peak intensity in the very small region at the center.

The aperture is typically filled with air. The aperture may become filled with an immersion fluid between the lens and the skin, but because of the small size of the aperture of less than 1 mm diameter (and more typically less than 0.5 mm diameter), the probability of filling with immersion fluid is low.

Even if the aperture is filled with an immersion fluid, the back-reflected damage may in any case be limited to the immersion fluid in the gap, which is not an issue. This is because the diameter of the central aperture is very low compared to the effective aperture that is filled.

The aperture may thus be filled with air, or a lens immersion fluid or a coupling medium. Preferably, the aperture is filled with a fluid (liquid or gas) having a different refractive index to the lens, so that the fluid does not perform the same lens focusing function. The aperture may even be evacuated and then sealed. The aperture may thus be open or it may be closed.

The fluid in the aperture is static. Thus, the aperture does not function as a flow channel but instead functions as an interruption to the lens function. The aperture is for example filled with a static medium having a refractive index different to the lens refractive index, for example a medium with a refractive index below 1.3 at the wavelength of the laser light.

The intensity profile is shown as plot 54, with a low intensity central portion 56, a medium intensity ring 58 and a high intensity ring in the middle of the medium intensity ring. Of course, this is a generalization since the intensity profile is smooth rather than discrete. The high intensity portion is converted from a central circle to a larger diameter annular ring, hence reducing the peak irradiance, but maintaining the overall flux.

This prevents contact window/exit lens damage and potential skin damage and thereby improves the safety and efficacy of LIOB based skin treatment. This design generates reduced levels of light back-reflected from the skin along the on-axis of the beam.

The laser beam pulses may have a circular cross sectional shape. The use of a circular beam will result in a loss of energy but this is very small.

The laser beam may instead by shaped before reaching the exit focusing lens 50 to form an annular laser beam. A beam shaping arrangement 64 is shown schematically in FIG. 4. In this way, there is no wasted laser energy which does not contribute to the focused beam. An annular beam can be created in many different known manners by adopting wave front control, for example using a spatial light modulator, a phase mask, a blocking mask, a holographic plate or a grating.

A beam shaping solution will be chosen which minimum the conversion loss, has low cost, and is least sensitive to tolerances of the system.

The skin treatment may comprise a hair removal shaving process. During use, the focusing system 23 is moved over the skin surface to be shaved. The focusing system forms an exit window for allowing the incident light beam to leave the device. The focusing system then forms an optical blade.

The skin treatment may comprise skin rejuvenation for reducing wrinkles that may appear in human skin as a result of normal aging processes. During use, the focusing element is pressed onto or kept close to the skin to be treated. The exit window formed by the focusing system is held parallel to the skin and the incident light beam leaves the exit window and enters the skin in a direction substantially perpendicular to the skin surface.

In both examples, an immersion fluid may be provided between the focusing system and the skin surface. Preferably, an immersion fluid is used with a refractive index close to the refractive index of the skin contact lens of the focusing system 23 and the skin or hair where the LIOB is to occur. For this purpose, fluids with a refractive index of about 1.4 to about 1.5 are suitable. Also water, although having a somewhat lower refractive index of 1.33, may for some devices and applications be a suitable immersion fluid.

The system of FIG. 1 has one particular set of optical components between the laser and the focusing system. However, this arrangement is not intended to be limiting. The feedback system of the invention may be used in different system configurations with a smaller or greater number of components.

FIG. 5 shows a light-based skin treatment method comprising:
  in step 70, providing a pulsed incident light beam for treating skin by laser induced optical breakdown of hair or skin tissue; and
  in step 72, focusing the incident light beam into a focal spot in the hair or skin tissue by focusing using an exit focusing lens having a central aperture.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A light-based skin treatment device comprising:
  a laser light source configured to provide a pulsed incident light beam for treating skin by laser induced optical breakdown of hair or skin tissue; and
  a focusing system configured to focus the incident light beam into a focal spot in the hair or skin tissue,
  wherein the focusing system comprises an exit focusing lens having a central aperture with a diameter less than 1 mm, and
  wherein the central aperture is coaxial with the incident light beam, and is filled with a static fluid.

2. The light-based skin treatment device of claim 1, wherein the laser light source comprises a 1064 nm laser.

3. The light-based skin treatment device of claim 1, wherein the laser light source is configured to deliver pulses of energy 1 to 10 mJ.

4. The light-based skin treatment device of claim 1, wherein the laser light source is configured to deliver pulses with a pulse duration of 100 fs to 10 ns.

5. The light-based skin treatment device of claim 1, wherein the central aperture has a diameter of less than 0.5 mm.

6. The light-based skin treatment device of claim 1, wherein the central aperture has at least one of: an area of less than 5% of the area of the exit focusing lens, or an area of less than 5% of the effective aperture of the exit focusing lens.

7. The light-based skin treatment device of claim 1, further comprising a beam shaping arrangement for generating an annular pulsed incident light beam.

8. The light-based skin treatment device of claim 7, wherein the beam shaping arrangement comprises at least one of: a spatial light modulator, a phase mask, a blanking mask, a holographic plate, and a grating.

9. The light-based skin treatment device of claim 1, wherein the diameter of the central aperture is substantially the same at opposing ends of the central aperture.

10. The light-based skin treatment device of claim 1, wherein the static fluid comprises a medium having a refractive index different than a refractive index of the lens.

11. A light-based skin treatment method comprising:
  providing a pulsed incident light beam for treating skin by laser induced optical breakdown of hair or skin tissue; and
  focusing the incident light beam into a focal spot in the hair or skin tissue by focusing using an exit focusing lens having a central aperture with a diameter of less than 1 mm,
  wherein the central aperture is coaxial with the incident light beam, and is filled with a static fluid.

12. The light-based skin treatment method of claim 11, wherein providing the pulsed incident light comprises providing 1064 nm laser light.

13. The light-based skin treatment method of claim 11, wherein providing the pulsed incident light beam comprises delivering pulses of energy 1 to 10 mJ.

14. The light-based skin treatment method of claim 11, wherein providing the pulsed incident light beam comprises delivering pulses with a pulse duration of 100 fs to 10 ns.

15. The light-based skin treatment method of claim 11, further comprising generating an annular pulsed incident light beam.

16. The light-based skin treatment method of claim 11, wherein the central aperture has a diameter of less than 0.5 mm.

17. The light-based skin treatment method of claim 11, wherein the central aperture has at least one of: an area of less than 5% of the area of the exit focusing lens, or an area of less than 5% of the effective aperture of the exit focusing lens.

18. The light-based skin treatment method of claim 11, further comprising generating, by a beam shaping arrangement, an annular pulsed incident light beam.

19. The light-based skin treatment method of claim 18, wherein the beam shaping arrangement comprises at least one of: a spatial light modulator, a phase mask, a blanking mask, a holographic plate, and a grating.

20. The light-based skin treatment device of claim 11, wherein the static fluid comprises a medium having a refractive index different than a refractive index of the lens.

* * * * *